No. 796,801. PATENTED AUG. 8, 1905.
H. BREYER.
FILTER.
APPLICATION FILED AUG. 25, 1904.
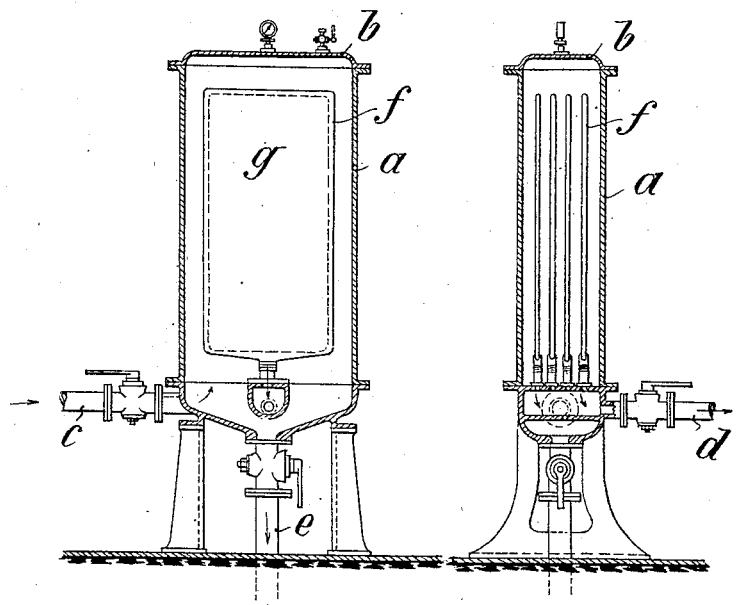
Witnesses.
James L. Norris, Jr.
Robert Everett.
Inventor.
Henriette Breyer.
By James L. Norris
Att'y.

UNITED STATES PATENT OFFICE.

HENRIETTE BREYER, OF KOGEL, AUSTRIA-HUNGARY, ASSIGNOR OF FOUR-FIFTHS TO ALFRED JURNITSCHEK VON WEHRSTEDT, OF CASTLE PUCHBERG, NEAR WELS, AUSTRIA-HUNGARY.

FILTER.

No. 796,801. Specification of Letters Patent. Patented Aug. 8, 1905.

Application filed August 25, 1904. Serial No. 222,141.

*To all whom it may concern:*

Be it known that I, HENRIETTE BREYER, a subject of the Emperor of Austria-Hungary, residing at Kogel, near Neubengbach, Lower Austria, Empire of Austria-Hungary, have invented certain new and useful Improvements in Filters, of which the following is a specification.

This invention relates to filters in which the parts that effect the cleansing of the liquid consist of vertical perforated metal plates provided with a covering or envelop of woven material that carries a deposit of filtering medium. Hitherto in such filters the said filtering medium has been formed of fibrous materials of the most varied kinds, such as vegetable fibers, cellulose, paper stuff, or asbestos. Vegetable fibrous materials have the drawback that the filtering medium composed thereof cannot be cleaned sufficiently after use to enable the filter to work permanently in a satisfactory manner or to deliver for a protracted period a filtrate which is completely or almost free from bacteria, whereas asbestos can only be reduced by tedious and costly means to the degree of fineness of fiber required to enable it to form a perfect filtering medium. Previous attempts to apply pulverulent filtering mediums to the woven fabric in filters of the construction referred to at the commencement hereof have yielded unsatisfactory results, because the filtering mediums employed did not adhere firmly to the woven fabric, and special binding or adhesive agents had to be employed for the purpose of fixing the filtering medium to the fabric.

I have now discovered that brick-dust or brick-flour deposited by precipitation from a state of suspension in liquid onto the woven fabrics surrounding the vertically-arranged perforated metal plates is extremely suitable for the production of filtering mediums and that it forms coats or coverings which adhere in such a manner as to allow of the filtration of water or other liquids to be effected in a manner that satisfies all requirements.

I prefer to form the filtering layer of brick-dust or brick-flour having grains or particles of different sizes.

A suitable filtering medium according to this invention is produced by pulverizing hard-burned bricks, sifting the powder, and then mixing grains or particles having a diameter of about 0.09 millimeter with grains or particles having a diameter of about 0.3 millimeter. This mixture when precipitated upon woven fabrics forms a layer of such nature that the coarser grains will lie directly upon the woven fabric and will be covered by the finer grains. This filtering medium adheres firmly to the woven fabric and has a perfect cleansing action.

The accompanying drawings represent in Figure 1 a vertical longitudinal section and in Fig. 2 a vertical cross-section of a form of a filter shown by way of example and in which the new filtering material is introduced.

The filter-box $a$, which is closed by a cover $b$, is provided with a tube $c$ for the admission of the raw unfiltered water, a tube $d$ for the discharge of the filtered water, and a tube $e$ for the discharge of the mud deposits. Within the box $a$ are arranged the filter elements $f$, consisting of vertically-standing perforated metal plates which are covered by a textile fabric, upon which latter the filtering medium $g$ is precipitated.

What I claim as new is—

In a filter, the combination with perforated metallic plates provided with an envelop of textile fabric, of a filtering medium deposited by precipitation upon the said fabric and firmly adhering to the same and consisting of brick-dust having the grains thereof of different sizes.

In testimony whereof I have hereunto set my hand in presence of two subscribing witnesses.

HENRIETTE BREYER.

Witnesses:
 JOSEF RUBASCH,
 ALVESTO S. HOGUE.